US008954965B2

(12) United States Patent
Novak et al.

(10) Patent No.: US 8,954,965 B2
(45) Date of Patent: Feb. 10, 2015

(54) TRUSTED EXECUTION ENVIRONMENT VIRTUAL MACHINE CLONING

(75) Inventors: Mark F. Novak, Newcastle, WA (US); Andrew John Layman, Bellevue, WA (US); Magnus Nyström, Sammamish, WA (US); Stefan Thom, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 13/566,250

(22) Filed: Aug. 3, 2012

(65) Prior Publication Data

US 2014/0040890 A1 Feb. 6, 2014

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| 7,444,670 | B2 * | 10/2008 | Berger et al. ...................... 726/3 |
| 7,613,921 | B2 * | 11/2009 | Scaralata ...................... 713/167 |
| 8,074,262 | B2 | 12/2011 | Scarlata |
| 2008/0244569 | A1 | 10/2008 | Challener et al. |
| 2009/0064292 | A1 | 3/2009 | Carter et al. |
| 2009/0113109 | A1 * | 4/2009 | Nelson et al. ...................... 711/6 |
| 2009/0169012 | A1 | 7/2009 | Smith et al. |
| 2009/0169017 | A1 * | 7/2009 | Smith et al. .................... 380/278 |
| 2009/0204964 | A1 | 8/2009 | Foley et al. |
| 2010/0042992 | A1 | 2/2010 | Vasilevsky et al. |
| 2010/0082991 | A1 | 4/2010 | Baldwin et al. |
| 2010/0115625 | A1 | 5/2010 | Proudler |
| 2010/0235828 | A1 | 9/2010 | Nishimura et al. |
| 2012/0110574 | A1 * | 5/2012 | Kumar .............................. 718/1 |
| 2013/0055252 | A1 * | 2/2013 | Lagar-Cavilla et al. .......... 718/1 |
| 2013/0159729 | A1 * | 6/2013 | Thom et al. .................... 713/189 |
| 2013/0263119 | A1 * | 10/2013 | Pissay et al. ...................... 718/1 |

OTHER PUBLICATIONS

Danev, et al., "Enabling Secure VM-vTPM Migration in Private Clouds", In Proceedings of the 27th Annual Computer Security Applications Conference, Dec. 5, 2011, pp. 187-196.
"International Search Report & Written Opinion for PCT Patent Application No. PCT/US2013/053109", Mailed Date: Oct. 4, 2013, Filed Date: Aug. 1, 2013, 8 Pages.

* cited by examiner

*Primary Examiner* — Lewis A Bullock, Jr.
*Assistant Examiner* — Jacob Dascomb
(74) *Attorney, Agent, or Firm* — Kate Drakos; David Andrews; Micky Minhas

(57) ABSTRACT

Cloning of a virtual machine having a trusted executed environment such as a software-based trusted platform module. In order to clone the virtual machine, the virtual machine state of the source virtual machine is copied to formulate a target virtual machine state that is to be associated with a target virtual machine. The target virtual machine is a clone of the source virtual machine state, and thus the storage hierarchy of the trusted execution environment may be the same for the trusted execution environment in the source and target virtual machine states. However, because the identity of the target virtual machine is different than that of the source virtual machine, the endorsement hierarchy of the target virtual machine state is altered such that it is based on the identity of the target virtual machine, rather than the source virtual machine.

20 Claims, 11 Drawing Sheets

US 8,954,965 B2

TRUSTED EXECUTION ENVIRONMENT VIRTUAL MACHINE CLONING

BACKGROUND

Trusted Platform Modules (or "TPMs") are trusted execution environments that are isolated from the regular operating environment of computing devices. Typically, TPMs are implemented in the form of a chip that is physically bound to a computing device. The regular computing environment may communicate with the TPM through an interface, an example of which being TPM Based Services (or "TBS").

TPMs provide a range of functions, the most commonly used including cryptographic key generation, policy-driven key use, sealed storage, and attestation. TPMs have a region of memory called a "protected area" that contains data that cannot be read from outside the TPM, but nevertheless operations may be performed using such data. Some of the data is immutable and thus is read (but not changed) by the operation that is being performed, and some of the data is mutable and can be changed through such operations. Note that it is the operation that is being performed internal to the TPM that is reading the data. The protected data is not readable outside the TPM.

Thus, the TPM has an operational component that performs operations, and a memory component which retains protected data that cannot be read outside of the TPM. The operational speed of the TPM is limited to the capabilities of the hardware within the TPM. Also, the size of the protected area is limited to the space within the TPM.

BRIEF SUMMARY

At least one embodiment described herein relates to the cloning of a virtual machine whose state includes a trusted execution environment, such as a software-based trusted platform module. In order to clone the virtual machine, the virtual machine state of the source virtual machine is copied to formulate a target virtual machine state that is to be associated with a target virtual machine. The target virtual machine is a clone of the source virtual machine state, and thus if there is a storage hierarchy, the storage hierarchy of the trusted execution environment may be the same in the source and target virtual machines. However, because the identity of the target virtual machine is different than that of the source virtual machine, the endorsement hierarchy of the target virtual machine state is altered such that it is based on the identity of the target virtual machine, rather than the source virtual machine.

The cloning may be performed for any purpose, such as, for instance, to make a copy of the source virtual machine so that both virtual machines may continue to operate from that point. Alternatively, the cloning may be performed in order to establish a rolled back state for the source virtual machine state. Thus, cloning and rollback, two key operations of virtualization, may be implemented in the context of a trusted execution environment that resists virtualization due to difficulties presented with cloning in that trusted execution context. In one embodiment, each virtual machine on a host computing system has an associated, software-based trusted execution environment, thereby allowing the virtual machine to be migrated along with its trusted execution environment. Thus, the principles described herein allow trusted execution environments to be virtualized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
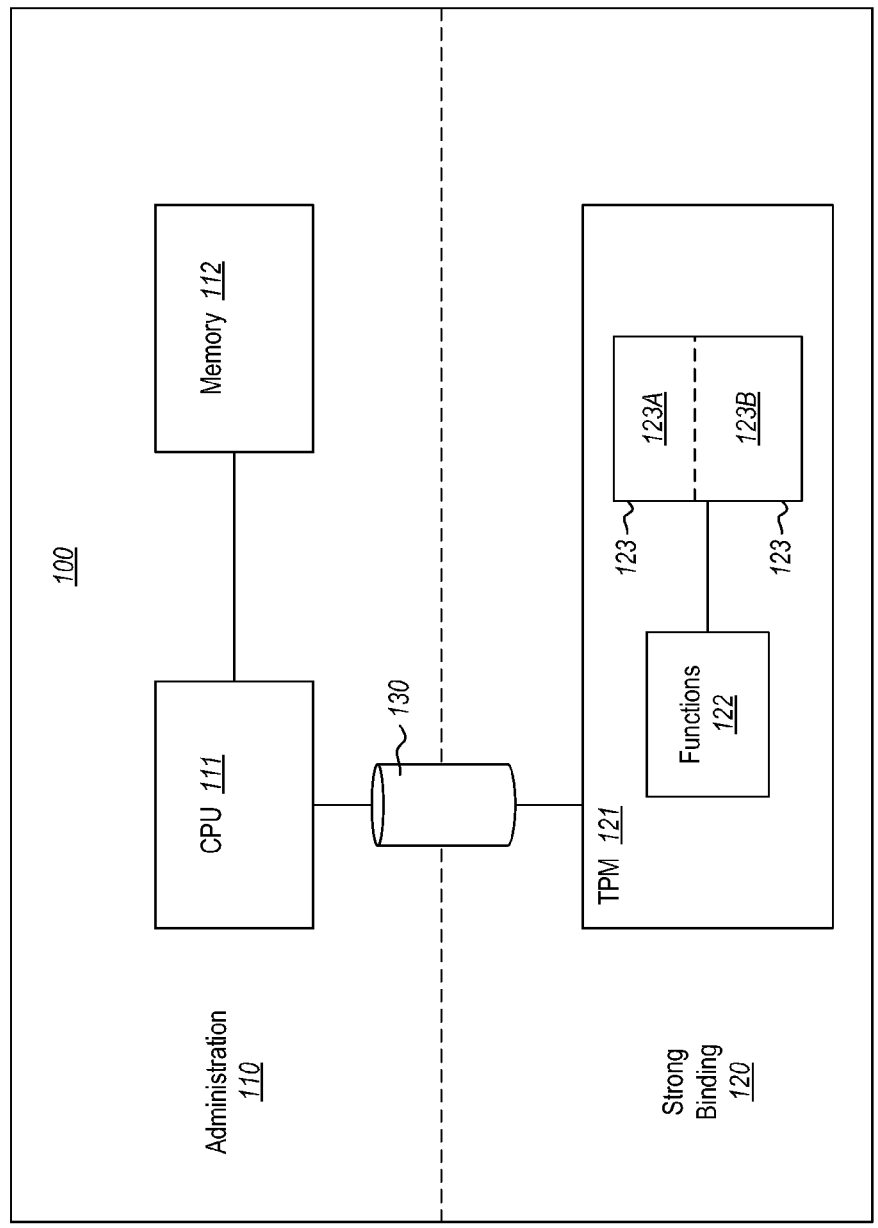
FIG. 1 illustrates an example computing system that may be used to employ embodiments described herein and which includes an administration level and a local trusted execution environment level.

In accordance with at least one embodiment described herein, the cloning of a virtual machine is described. The virtual machine includes a trusted execution environment, such as a software-based trusted platform module. In order to clone the virtual machine, the virtual machine state of the source virtual machine is copied to formulate a target virtual machine state that is to be associated with a target virtual machine. The target virtual machine is a clone of the source virtual machine state, and thus the storage hierarchy of the trusted execution environment may be the same for the trusted execution environment in the source virtual machine state and the target virtual machine state. However, because the identity of the target virtual machine is different than that of the source virtual machine, the endorsement hierarchy of the target virtual machine state is altered such that it is based on the identity of the target virtual machine, rather than the source virtual machine.

In some embodiments, each virtual machine is provided with its own migratable software-based trusted execution environment. Thus, at least some embodiments described herein allow virtualization of trusted execution environments by allowing virtual machines to be cloned, rolled back, and migrated along with the trusted execution environment.

Computing systems are now increasingly taking a wide variety of forms. Computing systems may, for example, be handheld devices (such as smart phones), appliances, laptop computers, desktop computers, mainframes, distributed computing systems, or even devices that have not conventionally been considered a computing system (such as wrist watches, kitchen appliances, automobiles, medical implants, and so forth). In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system.

As used herein, the term "module" or "component" can refer to software objects or routines that execute on the computing system. The different components, modules, engines, and services described herein may be implemented as objects or processes that execute on the computing system (e.g., as separate threads).

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions or data are physical storage media. Computer-readable media that carry computer-executable instructions or data are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like.

In this description and in the claims, a "device" is defined as any computing system that is not distributed. However, the invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In the description that follows, embodiments are described with reference to acts that are performed by one or more computing systems. If such acts are implemented in software, one or more processors of the associated computing system having executed computer-executable instructions. An example of such an operation involves the manipulation of data. The computer-executable instructions (and the manipulated data) may be stored in the memory of the computing system.

FIG. 1 illustrates an example of a computing system 100. The computing system 100 represents a physical machine that includes a trusted execution environment. The principles described herein provide a trusted execution environment in the context of a virtual machine. However, because trusted execution environments are conventionally used for physical machines, FIG. 1 is included to describe principles of a trusted execution environment.

The computing system 100 includes an administration domain 110 (or "administration level") and a local trusted execution environment domain 120 (or "local trusted execution environment level"). The administration domain 110 includes a processor 111 and a main memory 112. The main memory 112 is accessible to an administrator of the computing system 100 via the use of processor 111. The main memory 112 may be physical system memory, which may be volatile, non-volatile, or some combination of the two. The term "memory" may also be used herein to refer to non-volatile mass storage such as physical storage media.

The local trusted execution environment domain 120 cannot be accessed directly even by a human administrator. The local trusted execution environment domain 120 includes a Trusted Platform Module (TPM) 121 that includes cryptographic functions 122 and protected area 123. If there were any possible way to directly access the content of the TPM, that method would involve actually physically slicing or otherwise breaking apart the TPM and using complex equipment to physically examine the contents. Thus, the contents of the local trusted execution environment domain 120 are secure. The protected area 123 includes at least some content that is unreadable outside of the TPM. The cryptographic functions 122 can, however, operate using the content of the protected area 123. The protected area includes immutable data 123A and mutable data 123B. Both types of data can be read by the cryptographic functions 122. However, only the mutable data 123B can be written to by the cryptographic functions 122.

An example of immutable data is an endorsement key, which acts as a passport for the TPM, providing manufacturer-level security in the identity of the TPM. Furthermore, since conventional TPMs are physically attached to the computing system, the endorsement key also securely identifies the computing system 100, and thus may serve as a trust foundation for the computing system 100.

Examples of mutable data include other keys, monotonic counters, and non-volatile memory. The other keys may be constructed on the request of the processor 111. A monotonic counter is incremented when requested by the processor 111, or in response to certain events (such as powering on the system). Keys may be migratable or non-migratable. Migratable keys may be used in any TPM with proper authorization, whereas non-migratable keys may only be used in the TPM 121.

The computing system 100 includes an interface 130 for communicating between the processor 111 to the TPM 121. An example of a conventional interface 130 is a TPM Based Services module (TBS) that provides TPM commands from the processor 111 to the TPM 121, and if appropriate, provides results of the cryptographic processing (but of course not the content of the TPM 121) back to the processor 111.

Figure 2:
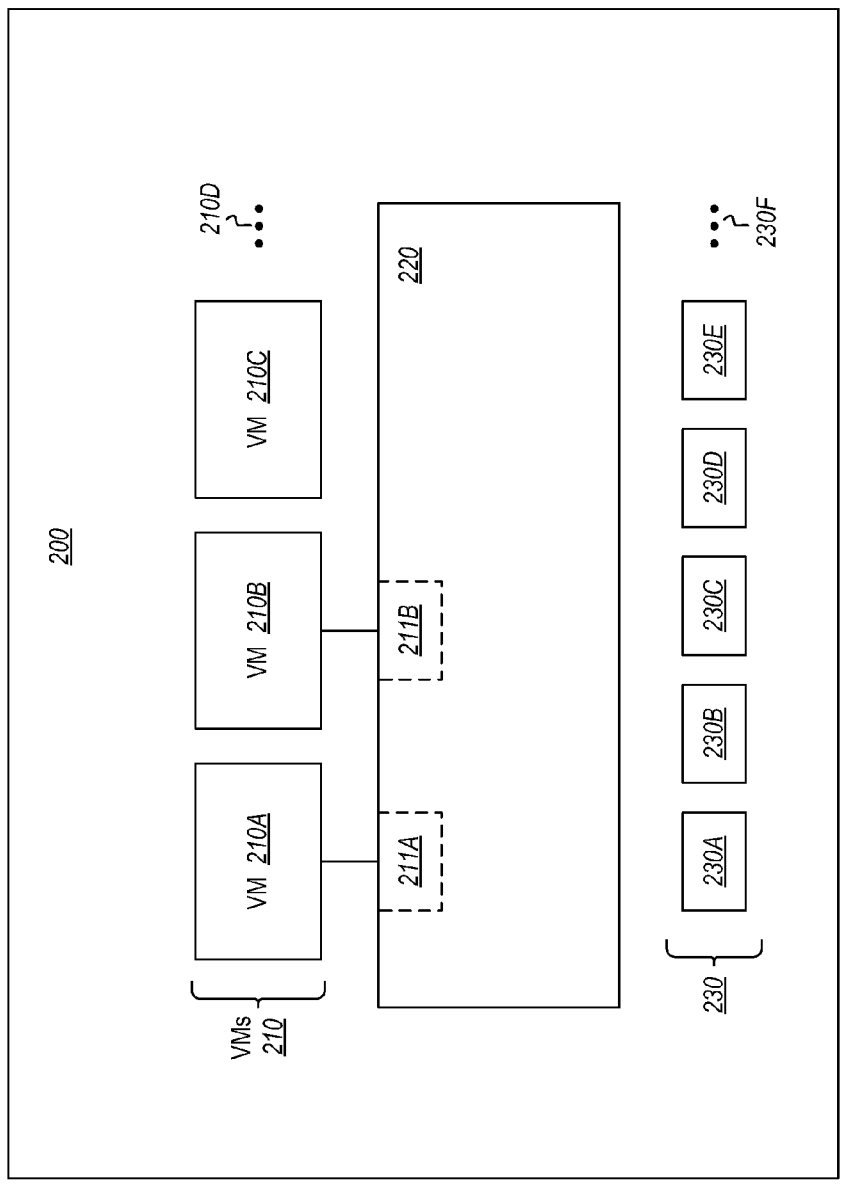
FIG. 2 illustrates a host computing system that runs multiple virtual machines, some of which having their own trusted execution environment.

The computing system 100 represents a physical machine that has a trusted execution environment. FIG. 2, on the other hand, illustrates a host computing system 200 (hereinafter referred to simply as "host") that runs multiple virtual machines, some of which have their own trusted execution environment. The host 200 is illustrated as operating three virtual machines 210 including virtual machines 210A, 210B and 210C. However, the ellipses 210D represents that the principles described herein are not limited to the number of virtual machines running on the host 200.

Some of the virtual machines 210A and 210B have their own trusted execution environment. For instance, virtual machine 210A has an associated trusted execution environment 211A, and virtual machine 210B has an associated trusted execution environment 211B. The virtual machine 210C does not have a trusted execution environment to illustrate that the principles described herein are not limited to the context in which all virtual machines each have their own trusted execution environment, so long as at least one virtual machine has its own trusted execution environment.

The trusted execution environments 211A and 211B are each implemented in software by a hypervisor 220 in a manner that the trusted execution environments are not directly readable by the respective virtual machines. Alternatively, as described before with respect to FIGS. 8 through 10, the trusted execution environments may be implemented by a cloud service outside the hypervisor 220. Comparing FIGS. 1 and 2, the combination of the virtual machine 210A and the trusted execution environment 211A emulates the computing system 100 of FIG. 1, with the administration domain 110 being emulated by the virtual machine 210A, and with the trusted execution environment domain 120 being emulated by the software-based trusted execution environment 211A managed by the hypervisor 220. Likewise, the combination of the virtual machine 210B and the trusted execution environment 211B also emulates the computing system 100 of FIG. 1, with the administration domain 110 being emulated by the virtual machine 210B, and with the trusted execution environment domain 120 being emulated by the software-based trusted execution environment 211B also managed by the hypervisor 220.

During operation, the virtual machines 210 each emulate a fully operational computing system including at least an operating system, and perhaps one or more other applications as well. Each virtual machine is assigned to a particular client, and is responsible for supporting the desktop environment for that client. In some cases, such as when the virtual machine is a virtual server, the virtual machine may be assigned to one or multiple clients. The virtual machine generates a desktop image or other rendering instructions that represent a current state of the desktop, and then transmits the image or instructions to the client for rendering of the desktop.

As the user interacts with the desktop at the client, the user inputs are transmitted from the client to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the perspective of the user, it is as though the client computing system is itself performing the desktop processing.

In addition to managing the trusted execution environments 211A and 211B, the hypervisor 220 emulates virtual resources for the virtual machines 210 using physical resources 230 that are abstracted from view of the virtual machines 210. The hypervisor 220 also provides proper isolation between the virtual machines 210. Thus, from the perspective of any given virtual machine, the hypervisor 220 provides the illusion that the virtual machine is interfacing with a physical resource, even though the virtual machine only interfaces with the appearance (e.g., a virtual resource) of a physical resource, and not with a physical resource directly. Thus, the hypervisor 220 intermediates between the virtual machines 210 and the physical resources 230. In FIG. 2, the physical resources 230 are abstractly represented as including resources 230A through 230F. Examples of physical resources 230 include processing capacity, memory, disk space, network bandwidth, media drives, and so forth.

Figure 3:
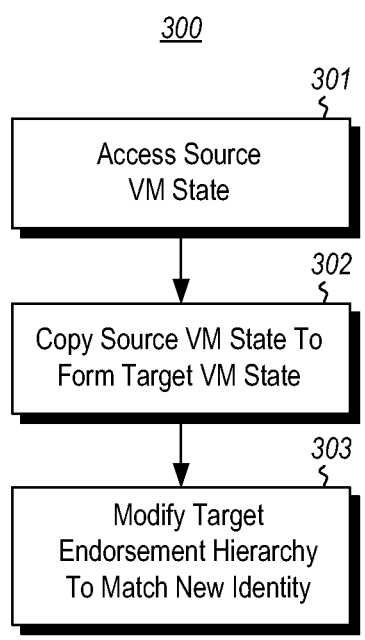
FIG. 3 illustrates a flowchart of a method for cloning a source virtual machine to form a target virtual machine in the context of those virtual machines having a trusted execution environment.
Figure 4A:
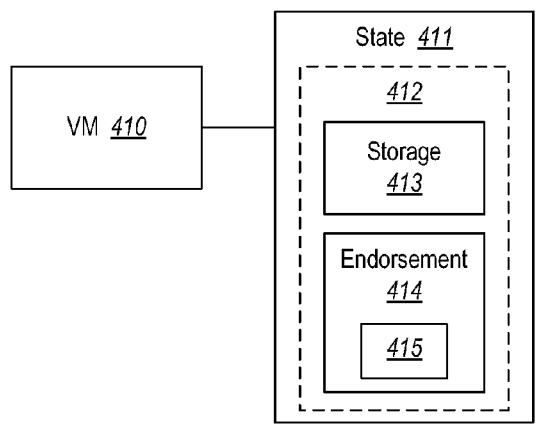
FIG. 4A illustrates a situation in which there is a trusted execution environment associated with a source virtual machine.
Figure 4B:
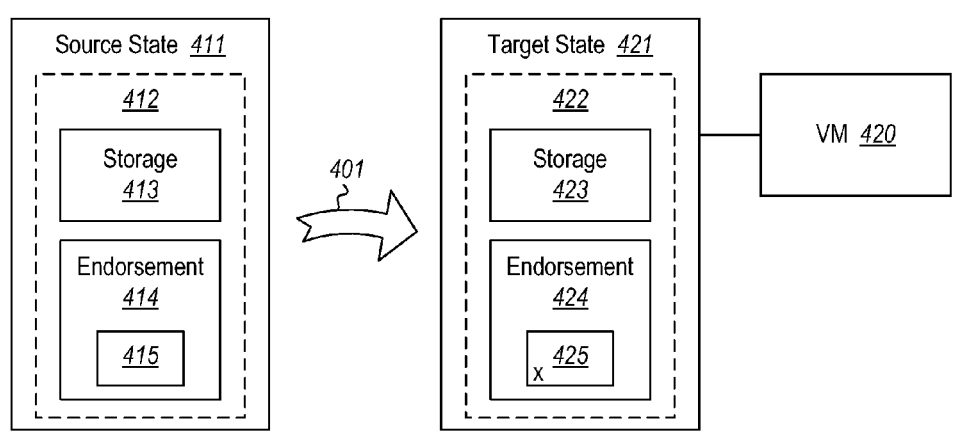
FIG. 4B illustrates a situation in which the trusted execution environment of the source virtual machine is copied to create a trusted execution environment of a target virtual machine.
Figure 4C:
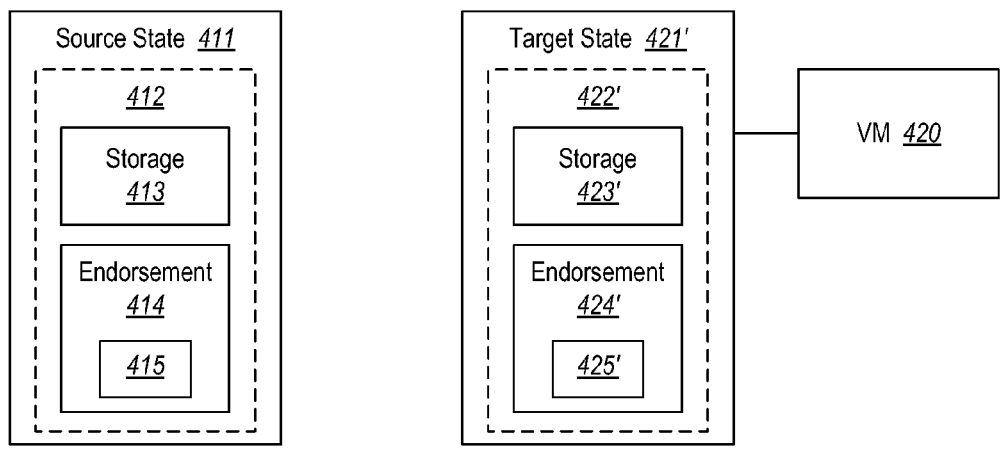
FIG. 4C illustrates a situation in which the endorsement hierarchy of the trusted execution environment of the target virtual machine is modified to be based on the identity of the target virtual machine.

FIG. 3 illustrates a flowchart of a method 300 for cloning a source virtual machine to form a target virtual machine in the context of those virtual machines having a trusted execution environment. The method 300 may be performed by, for example, the host computing system 200 of FIG. 2. For instance, suppose the host 200 is to clone virtual machine 210A. The method 300 may be performed in the context of the sequence of situations (or states) illustrated with respect to FIGS. 4A through 4C, and thus FIG. 3 will be described with frequent reference to FIGS. 4A through 4C, as well as FIG. 2.

The source virtual machine state of a source virtual machine is accessed (act 301). For instance, in the situation 400A of FIG. 4A, the source virtual machine state 411 of a source virtual machine 410 is accessed. The source virtual machine state 411 includes a trusted execution environment 412 that has at least an endorsement hierarchy 414, but may also have a storage hierarchy 413. The storage hierarchy 413 may be used by the virtual machine to access storage (e.g., stored data and/or code). The endorsement hierarchy 414 has a signing portion 415, which allows the source virtual machine or its authenticated user to sign statements. The endorsement hierarchy 414 is based on the identity of the source virtual machine 410. In one embodiment, the signing portion 415 of the endorsement hierarchy 414 is only enabled if the endorsement hierarchy is present in the trusted execution environment 412 of the source virtual machine 410. In the example in which the virtual machine 210A of FIG. 2 is to be cloned, the virtual machine 410 is an example of the virtual machine 210A, and the trusted execution environment 412 is an example of the trusted execution environment 211A.

Next, the source virtual machine state is copied (act 302) to formulate a target virtual machine state. For instance, referring to situation 400B of FIG. 4B, the source virtual machine state 411 is copied (as represented by arrow 401) to formulate the target virtual machine state 421. The target virtual machine state 421 includes a target trusted execution environment 422, which may be a copy of the source trusted execution environment 412. The target trusted execution environment 422 includes a storage hierarchy 423 which may be a copy of the storage hierarchy 413 that is in the source trusted execution environment 412, and an endorsement hierarchy 424 which may be a copy of the endorsement hierarchy 414 that is in the source trusted execution environment 412.

The signing portion 425 in the target endorsement hierarchy, however, is disabled as a result of the copying (as represented by the "x" in the lower left corner of the box 425 representing the signing portion). This is because the target endorsement hierarchy 425 is a copy of the source endorsement hierarchy 415, which is based on the identity of the source virtual machine 410, and not based on the target virtual machine 420.

The method 300 then includes modifying the target virtual machine state such that the endorsement hierarchy of the target virtual machine state is based on the identity of the target virtual machine, rather than the source virtual machine (act 303). For instance, in the situation 400C of FIG. 4C, note that the signing portion 425 has been altered to portion 425'. However, the "x" in the lower left corner of the box has been removed to reflect that the endorsement hierarchy 424 is now based on the identity of the target virtual machine 420, and not the source virtual machine 410. Accordingly, the signing portion 425' is now enabled to sign on behalf of the target virtual machine 420 and/or its authenticated user. Note that because the signing portion 425' is changed, those portions that contain the signing portion 425' are also shown as changed. For instance, endorsement hierarchy 424 becomes endorsement hierarchy 424', target trusted execution environment 422 becomes target trusted execution environment 422', and target virtual machine state 421 becomes target virtual machine state 421'.

This cloning operation may be used to roll back the state of the virtual machine 410, or to copy the virtual machine 410 so that both copies 410 and 420 continue operation initially based on the same virtual machine state (though the states will presumably diverge from that point due to different operations being performed on each virtual machine 410 and 420).

For instance, in the case of roll back, the source virtual machine 410 was operating when, at some point, a snapshot was taken of the source virtual machine state 411. There may be a number of such snapshots taken as the source virtual machine 410 was operating. Now, suppose that the user decides to roll back the source virtual machine 410 to a prior time corresponding to a snapshot. In this case, the cloning method 300 would be performed on a source virtual machine state 411 that represents the state of that source virtual machine 410 that was previously captured at that point in time. In this case, the source virtual machine 410 would no longer operate, but the target virtual machine 420 would continue as the rolled back version of the source virtual machine 410.

Alternatively, the cloning method 400 may be performed on a current state of the source virtual machine 410. In this case, when such duplication is to occur, the source virtual machine 410 is paused, and the current virtual machine state is captured, resulting in the source virtual machine state 411. The cloning method occurs resulting in the target virtual machine state 421, which has an endorsement hierarchy that is modified to be based on the new identity of the target virtual machine 420. Thus, in this case, after duplication occurs, the source virtual machine 410 continues to operate beginning with the source virtual machine state 411, and the target virtual machine 420 begins operation using the target virtual machine state 421.

Figure 5:
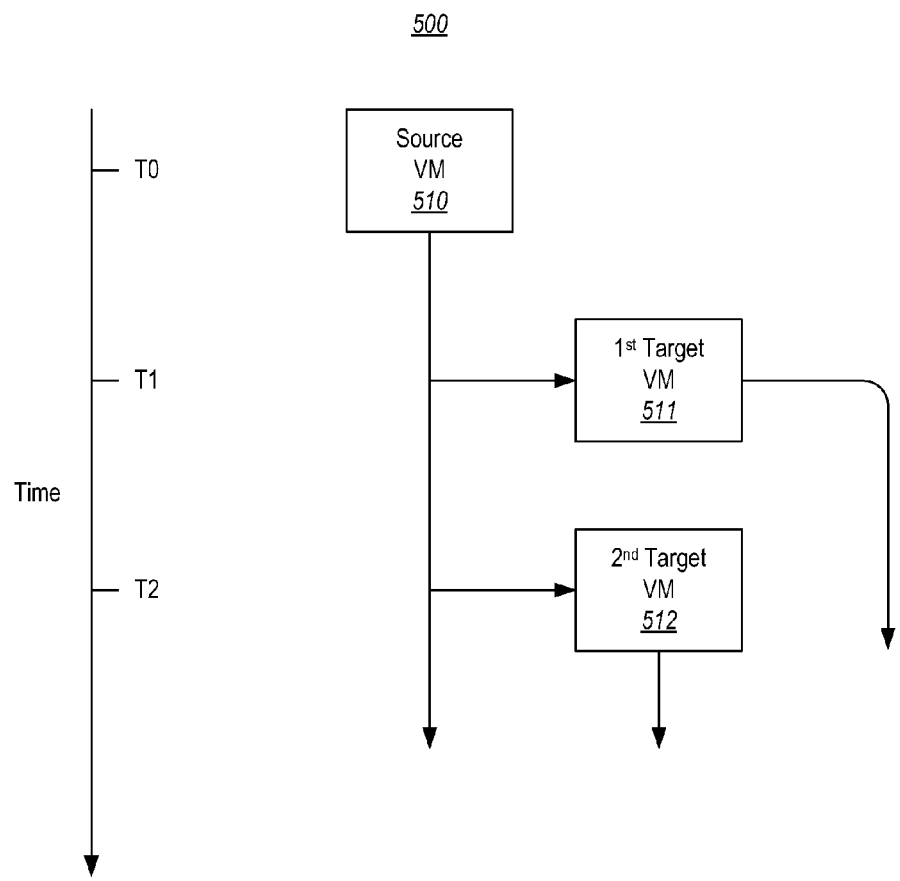
FIG. 5 illustrates a process in which the source virtual machine is cloned twice to form two target virtual machines.

FIG. 5 illustrates a process 500 in which the source virtual machine 510 is cloned twice. The source virtual machine 510 begins operation at time T0. Then, at time T1, the source virtual machine 510 is cloned to form the first target virtual machine 511. From time T1, the target virtual machine 511 may begin operation. Also from time T1, the source virtual machine 510 continues to operate until time T2. At time T2, the source virtual machine 510 is again cloned to form the second target virtual machine 512. Accordingly, multiple target virtual machines may be cloned from a single source virtual machine, whether at the same time, or at different times. For instance, as an alternative, target virtual machines 511 and 512 may both be cloned from source virtual machine 510 at time T1. Furthermore, in FIG. 5, note that in one embodiment, the source virtual machine 510 may continue operating from time T2, but in case of a rollback, the rollback causes the continued execution of the source virtual machine 510 after time T2 to be abandoned in favor of continued execution via the target virtual machine 512. Also, note that since method 300 was applied, the endorsement hierarchy for the trusted execution environments for each of the two target virtual machines will be based on their respective identities.

Figure 6:
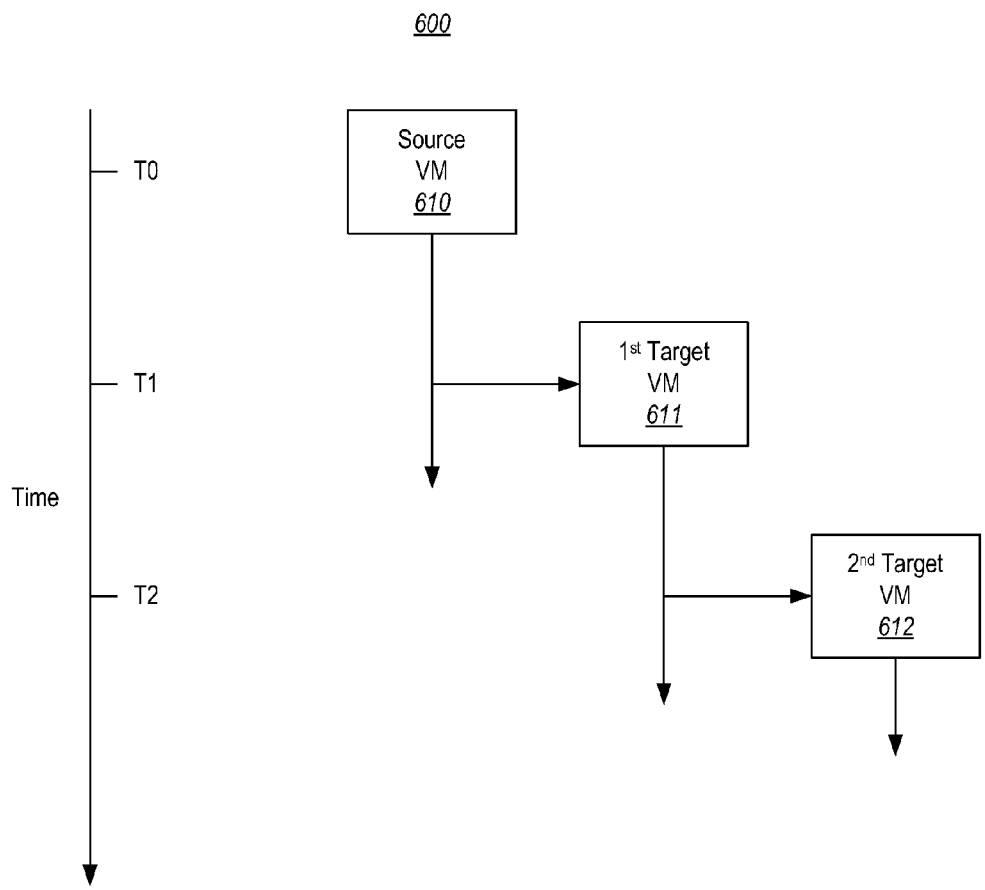
FIG. 6 illustrates a process in which the source virtual machine is cloned to create a target virtual machine, and then that target virtual machine becomes a source virtual machine for another cloning.

FIG. 6 illustrates a process 600 in which the source virtual machine 610 is cloned to create a target virtual machine 611, and then that target virtual machine 611 becomes a source virtual machine for another cloning of a second target virtual machine 612. The source virtual machine 610 begins operation at time T0. Then, at time T1, the source virtual machine 610 is cloned to form the first target virtual machine 611. From time T1, the target virtual machine 611 may begin operation until time T2. At time T2, the target virtual machine 611 is cloned to form the second target virtual machine 612. Accordingly, cloning of a target virtual machine is also possible. Note that the source virtual machine 610 may continue operating from time T1, but in case of a roll back, the roll back may cause the continued execution of the source virtual machine 610 after time T1 to be abandoned in favor of continued execution via the target virtual machine 611. Similarly, the target virtual machine 611 may continue operating from time T2, but in case of a roll back, the roll back may cause the continued execution of the target virtual machine 611 after time T2 to be abandoned in favor of continued execution via the target virtual machine 612.

Figure 7:
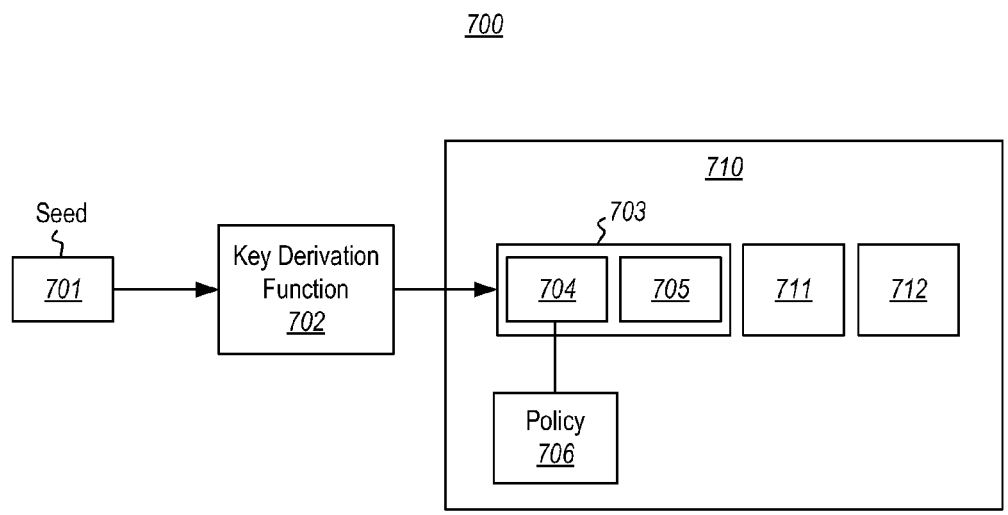
FIG. 7 illustrates a specific architecture for the generation and structure of a trusted execution environment that allows the method of FIG. 3 to be performed.

FIG. 7 illustrates a specific architecture 700 for the generation and structure of a trusted execution environment that allows the method 300 to be performed. This specific implementation may use, for instance, TPM version 2.0, as specified by the Trusted Computing Group organization. In that standard, a seed value 701 may be fed into a key derivation function 702 to generate an endorsement key 703, which is contained within the endorsement hierarchy of the trusted execution environment 710.

The endorsement key 703 includes a signing portion 704 that may be used to sign new statements on behalf of the virtual machine (or its authenticated user) that the trusted execution environment serves. For instance, the signing portion 704 may be the private portion of the endorsement key 703. The endorsement key 703 also includes a verifying portion 705 that may be used to verify previous statements made by the virtual machine (or its authenticated user) that the trusted execution environment serves.

TPM version 2.0 allows policy to be attached to the use of the endorsement key. In FIG. 7, policy 706 is assigned to the use of the signing portion 704 of the endorsement key 703. Specifically, the signing portion 704 is enabled on the condition that the identity of the associated virtual machine has not changed from the identity that forms the basis of the endorsement hierarchy. For instance, in the example of FIG. 4A, the signing portion 415 of the endorsement key is conditioned on the identity of the corresponding virtual machine (i.e., source virtual machine 410) being the basis of the endorsement hierarchy 414. Since the execution environment 412 was created with the endorsement hierarchy 414 being based on the identity of the source virtual machine 410, the signing portion 415 is enabled. However, in FIG. 4B, since the signing portion 425 is a copy of the signing portion 415, the signing portion 425 is not enabled until the signing portion is modified to be based on the new identity of the target virtual machine as illustrated and described with respect to FIG. 4C.

In some embodiments, the proof of whether or not the endorsement hierarchy is based on the identity of the virtual machine is provided with a value in persistent memory 711 (e.g., a PCR value), and with a monotonic counter 712. When the trusted execution environment 710 is copied as part of the cloning of a virtual machine, the value of the PCR 711 would remain the same also. However, in conjunction with the copying operation, the value of the PCR 711 associated with target virtual machine is altered as compared to the value of the PCR 711 still associated with the source virtual machine. For instance, the PCR 711 value may be altered in a manner that the information regarding the cloning is derivable from the new value. Thus, the PCR 711 of any given virtual machine may be referenced to view the cloning history that created the given virtual machine.

Alternatively or in addition, the proof of whether or not the endorsement hierarchy is based on the identity of the virtual machine is provided using a value of a persistent monotonic counter 712 of the trusted execution. For instance, in conjunction with the copying operation, the counter 712 may be incremented. Thus, the counter 712 within the target virtual machine state will be incremented by one as compared to the counter 712 in the source virtual machine state. Thus, the PCR value 711 and the counter 712 may uniquely identify any cloned virtual machines as having a distinct identity as compared to the source virtual machine. Also in conjunction with the copying operation, a new endorsement key is created that is bound to the new PCR value 711 and the new counter value 712. This allows the endorsement hierarchy that is founded on the endorsement key to be based on the new identity. In one embodiment, the creation of the new endorsement key is performed by creating a master key that issues a master certificate at the time that the original source virtual machine was created. This master certificate may be used to verify that the target virtual machine is indeed a clone of the source virtual machine, thereby allowing the hypervisor to confidently issue a new endorsement key to the target virtual machine.

Thus, what is described is a mechanism for allowing virtual machines to operate with a trusted execution environment (such as a software-based trusted platform module) while allowing the virtual machine to be cloned, rolled back and migrated, without adversely affecting the security provided by the trusted execution environment.

Referring to FIG. 2, the trusted execution environments are illustrated as operating on the same host computing system 200. However, the principles described herein are not limited to the location of the trusted execution environment as compared to the location of the virtual machine. As an example, the trusted execution environment might be, for example, a cloud based trusted execution environment such as is described hereinafter.

Figure 8:
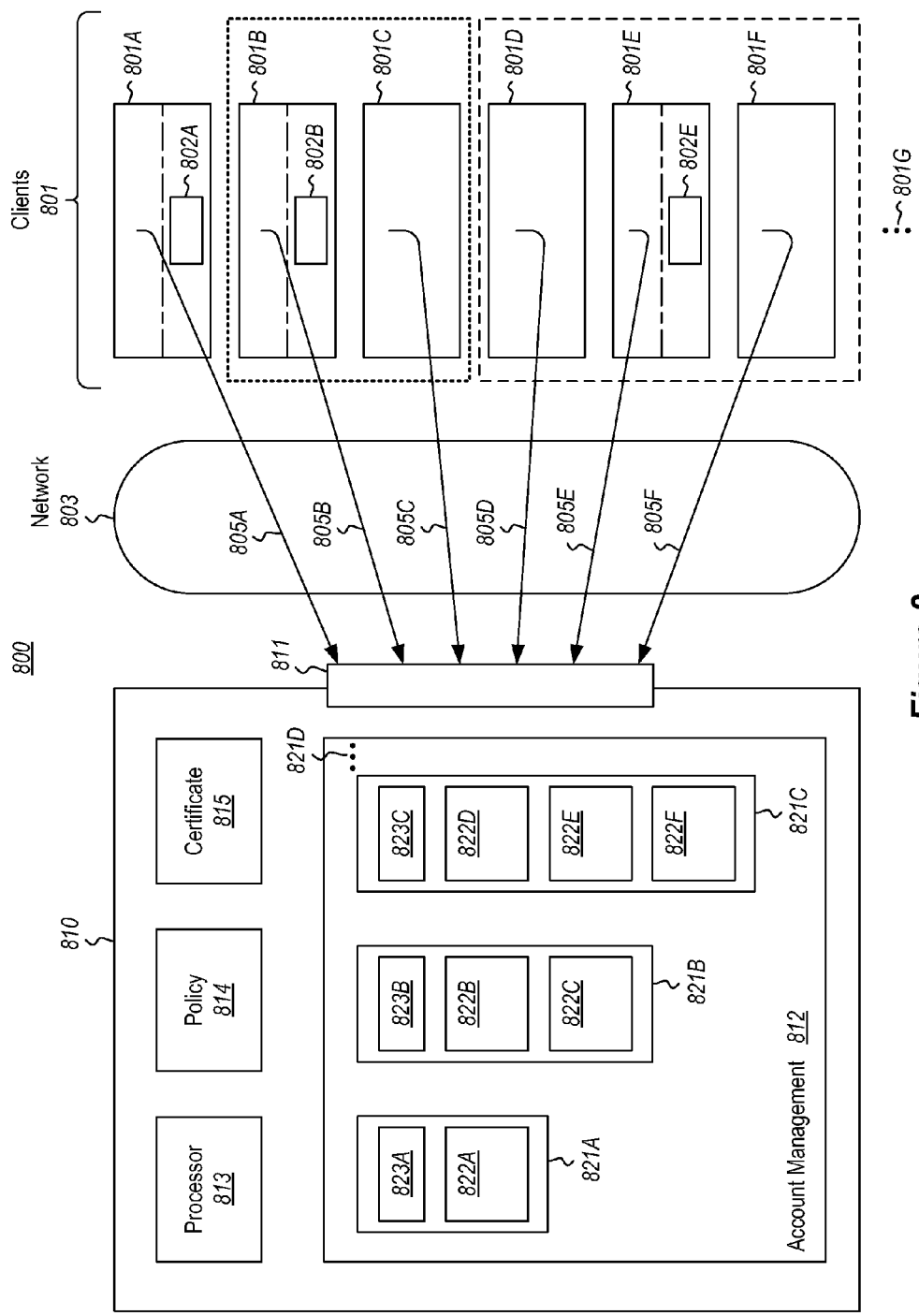
FIG. 8 illustrates an environment in which multiple clients, some of which utilize a Trusted Platform Module (TPM) interface with a system over a network.

FIG. 8 illustrates an environment 800 in which the principles described herein may be employed. Specifically, the environment 800 includes multiple client computing systems 801 (hereinafter referred to as "clients 801"). Each of the clients 801 may be, for example, a virtual machine such as the virtual machines 210 of FIG. 2. The principles described herein allow at least some local trusted execution environment functionality to be offloaded from the clients over a network 803 into the system 810. This is counterintuitive as traditionally TPM modules operate at the local trusted execution environment level, and thus are physically tied to the client. In the case of FIG. 8, multiple clients are able to offload TPM functionality to the system 810. An example of the network 803 is the Internet, although the principles described herein may also be applied to other networks, such as perhaps an enterprise network.

The functionality of the TPM is offloaded by having the system 810 emulating the protected area and its non-readability feature. For instance, whereas a traditional TPM has a protected area that includes data that cannot be read outside of the TPM, the system 810 has a protected area for each entity, and the protected area is not readable from outside of the system, or from outside of the account, except by the a security processor 813. Since the system 810 is not easily breached to thereby allow another entity to read the protected data, the system 810 provides an equivalent of local trusted execution environment security in creating a significant barrier to discovery of the content of the protected area.

Furthermore, a security processor 813 may respond to the trusted execution environment commands in the same manner that a local TPM would normally respond to such trusted execution environment commands. For instance the security processor 813 may perform cryptographic and/or security processing on keys and/or protected data sets. This allows much of the functionality of the TPM to be emulated. If a client is destroyed, the TPM is still available in the system 810, and thus keys and other data (such as monotonic counters, non-volatile RAM contents, and so forth, associated with the TPM) that were generated from the TPM may still be used.

In FIG. 8, there are six clients 801A through 801F illustrated. However, the ellipses 801G represents that the principles described herein are not limited to the particular number of clients 801 connected to the system 810. There may be as few as one, but potentially many, especially if the network 803 is the Internet and/or the system 810 is a cloud computing environment. Furthermore, the number of clients 801 may change over time. For instance, if the system 810 were a cloud computing environment, the number of clients 801 could vary by the second or minute.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Some of the clients 801 might include a TPM, and some might not. For instance, in the case of FIG. 8, client 801A has TPM 802A, client 801B has TPM 802B, and client 801E has client 802E. Others of the clients including clients 801C, 801D or 801F do not have a TPM. The presence of a TPM allows some machine specific functionality of the TPM to be offloaded (such as the ability to provide a trusted event history associated with the machine) as will be explained below, even though the local client TPM might not be fully performing as a TPM. However, even without a TPM, some of the TPM functionality may still be offloaded as described below.

A system 810 includes a reception module 811 that receives trusted execution environment commands issued by the clients 801. The trusted execution environment commands that would normally be issued to a TPM using a TPM software interface (such as TBS) are instead intercepted, and dispatched to the system 810 to thereby be received by the reception module 811. For instance, clients 801A through 801F dispatch such trusted execution environment commands as represented by corresponding arrows 805A through 805F. Each trusted execution environment command is a command to operate on a security context (e.g., a key or data) that corresponds to an entity that issued the command. The system includes a security processor 813 that performs cryptographic and security functions in response to the trusted execution environment commands received by the reception module 811.

The system 810 also includes an account management module 812 that includes multiple protected accounts 821. In FIG. 8, the accounts includes three accounts 821A, 821B and 821C, although the ellipses 821D represents that there may be any number of accounts managed by the system 810. Each account corresponds to one or more of the clients 801 and includes a protected data set corresponding to each client. Each protected data set emulates what a protected area of a TPM would look like for each client. However, since the protected data set is not limited to the small area of the TPM, the protected data set may be much larger, perhaps in the megabyte, gigabyte, or terabyte ranges.

In FIG. 8, the account 821A has a protected data set 822A that corresponds to the client 801A. The account 821B has a protected data set 822B that corresponds to the client 801B, and a protected data set 822C that corresponds to the client 801C. The respective clients for the account 821B are encompassed by a dotted-lined box. The account 821C has a protected data set 822D that corresponds to the client 801D, a protected data set 822E that corresponds to the client 801E, and a protected data set 822F that corresponds to the client 801F. The respective clients for the account 821C are encompassed by a dashed-lined box.

The protected data sets 822 are "protected" in the sense that their contents are not readable outside of the context of the system, and perhaps not readable outside of the corresponding account, except perhaps by the security processor 813. In one embodiment, an instance of the security processor 813 is run inside of the context of the account. In that case, there would be a security processor 813 inside the account 821A, another security processor 813 inside the account 821B, and another security processor 813 inside the account 821C.

Figure 9:
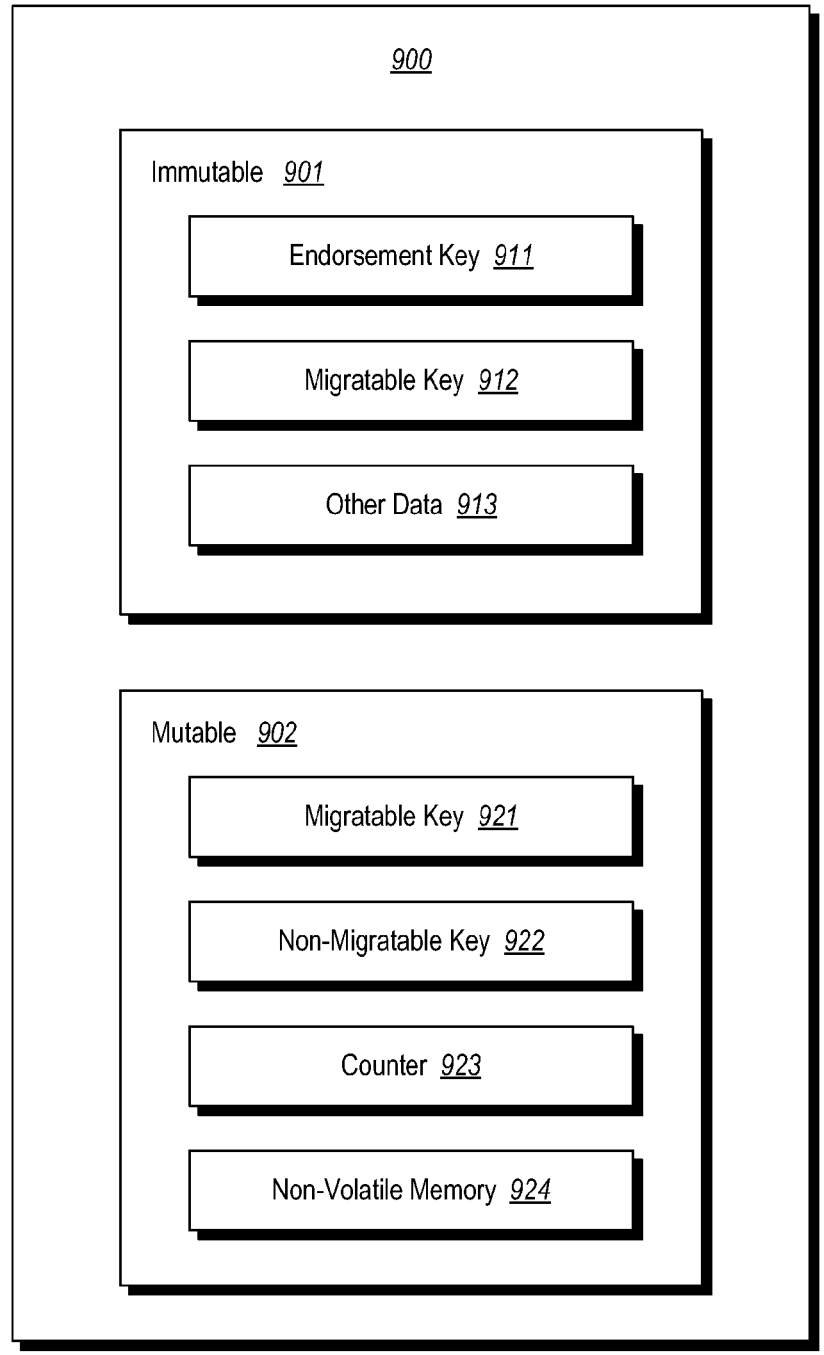
FIG. 9 abstractly illustrates protected data set as including immutable data and mutable data.

Each data set emulates an example of what the corresponding client 801 might have in its TPM if there were no memory restrictions to that TPM. For instance, FIG. 9 illustrates a particular data set 900 that includes immutable data 901 and mutable data 902. For instance, immutable data 901 includes an endorsement key 911, which is non-migratable. The immutable data 901 also includes a migratable key 912, and other immutable data 913. The mutable data 902 includes a migratable key 921, a non-migratable key 922, a monotonic counter 923, and non-volatile memory 924.

All of the data set 900 is protected as mentioned above. However, immutable data 901 cannot be changed, even by the security processor 813. Mutable data 902 can be changed, but only in response to execution of the security processor 813. An endorsement key 911 is a non-migratable key in that it can only be used inside the account corresponding to the data set. However, the migratable key 912 can be used outside of the account, but only under protected circumstances (such as in another TPM or another similarly configured account) that prevents reading the migratable key in the clear. The immutable data 901 also may include other data 913. The mutable data 902 may also have migratable and non-migratable keys such as migratable key 921 and non-migratable key 922. The mutable data 902 may also include a monotonic counter that irreversibly increments in response to a request to increment, and/or in response to another event (such as a powering up of the machine). The mutable data 902 also may include non-volatile memory.

Optionally, each protected account 821A through 821C may further include a corresponding account-level data set 823A through 823C. For instance, account 821A has account-level data set 823A, account 821B has account-level data set 823B, and account 821C has account-level data set 823C. Each account-level data set is not specific to any of the entities associated with the account, but is general to the account itself. As an example, using existing TPM communication protocols, upper level PCRs (such as PCR 24 and above) may be used for such account-level data.

As an example, suppose the account 821B corresponds to a particular user, the account-level data set 823B might list user passwords. The account-level data set 823B might also be used to record immutable events associated with the account. For instance, the account-level data set 823B might store a record of high-sensitivity functions (such as account and session management) in the operating system. Furthermore, being able to tie an account to other trusted platform module (TPM) properties, like PCRs for example, allows implicit attestation of the system for a user to be successfully authenticated and operational. As another example, the user might store a sequence of licenses that the user has signed up for. Again, this sequence could be immutable, and perhaps made using a single entry from which the sequence of licenses can be mathematically derived. In that case, if the question ever came up as to whether the user had a license to a particular product, the user may concretely know the answer.

Accordingly, what is described is an effective way to off-load guaranteed immutability of a content of a protected area from a local TPM to a service over a network, such as in a cloud computing environment. This is accomplished by intercepting trusted execution environment commands that are issued from a client processor to a TPM, and redirecting them over a network to a system that has a security processor that is capable of interpreting the trusted execution environment commands, and a data set for each client that includes data that is to be protected.

This preserves the security of a local trusted execution environment layer since the protected area (e.g., the data set) would be extremely difficult or impossible to breach, essentially requiring a breach of the system 810 in order to access the protected data. Since the system 810 might be quite sophisticated and have high levels of security, breaching of the system 810 would be extremely difficult or impossible. Such difficulty or impossibility might even exceed that of attempting to breach a client TPM on the client machine itself. Accordingly, local trusted execution environment security is preserved. Although information may be communicated from the client to the system, 810, such information is only the trusted execution environment commands, not the actual data being protected in the data set. Accordingly, even if someone could read such traffic, the protected data remains protected. In some embodiment, even the network traffic may be encrypted if a trust relationship exists between the client processor and the system 810. Such might be helpful in the case of there being security issues associated with transmitting commands in the clear. Such a trust relationship could be, for example, bootstrapped at the time the client is provisioned.

As an additional benefit, since the memory space is no longer limited to a small chip, the amount of available memory may be significantly increased. Furthermore, since processing power is no longer limited to a small TPM chip, cryptographic processes may be much more efficiently executed and/or made more complex. Also, since the protected area is no longer physically coupled to the client, if the client is destroyed, the keys that were constructed using data from the protected area may still be used.

Figure 10:
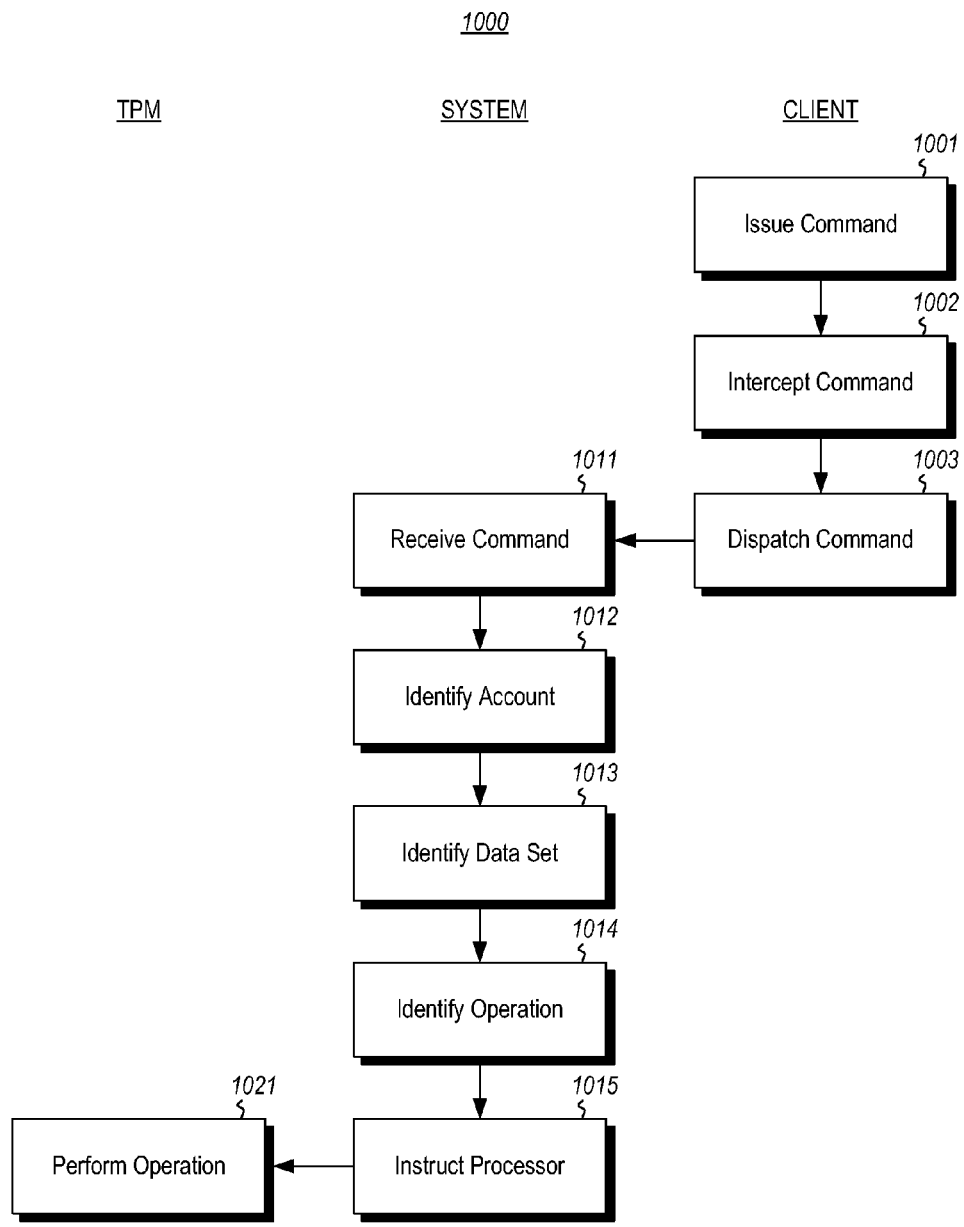
FIG. 10 illustrates a flowchart of a method for managing a trusted execution environment command.

Before further aspects are described, a general processing flow associated with the processing of a trusted execution environment command will be further described herein. In particular, FIG. 10 illustrates a flowchart of a method 1000 for processing a trusted execution environment command. As an example, the trusted execution environment command may be any TPM command, whether conforming to any existing protocol (such as TPM version 2.0) or whether conforming to a future TPM protocol or any protocol that facilitates communication with a local trusted execution environment layer. Some of the acts of the method 1000 are performed by the client (e.g., client 801A) as illustrated in the right column of FIG. 10 under the header "CLIENT". Others of the acts are performed by the system 810 as illustrated in the middle column of FIG. 10 under the header "SYSTEM". Other acts are performed by the security processor 813 as illustrated in the left column of FIG. 10 under the header "TPM".

The process begins when the client issues a trusted execution environment command (act 1001). Rather than, or in addition to, being dispatched to a local TPM on the client, the trusted execution environment comment is intercepted (act 1002), and dispatched to the system (act 1003).

The system then receives the trusted execution environment command (act 1011), identifies an account associated with the client that issued the trusted execution environment command (act 1012), identifies a data set associated with the client (act 1013), and identifies the operation to be performed (act 1014). The security processor is then instructed to perform the operation (act 1015), and the security processor then performs the operation (act 1021) on the identified data set of the identified account.

One of the functions of a TPM not yet mentioned relies on the ability to detect a power cycle of the corresponding client. This is one of the reasons why the TPM is bound within the corresponding client, and hardwired to the power supplies of the client, so that the TPM can detect a loss of power, and a recovery of power. One of the reasons for detecting a power cycle is so that the TPM can reset some of the data within the protected data upon experiencing a loss and recovery of power. In some cases, the reliability of some of the machine-specific data within the TPM relies on knowing about power cycles.

One example of data that should be reset upon a power cycle is a platform event log. In a typical TPM, the event log is represented as a single entry. Whenever a new event of interest occurs (e.g., a loading of a piece of software, or a start of execution of a piece of software), that event is concatenated with the previous entry, hashed, and then stored as a new value of the entry. If this is done in a manner that the information (i.e., the previous events) from the old entry is preserved, then the entry can be mathematically evaluated to play back the sequence of events that have occurred in the platform. From this, platform integrity can be proved.

However, since the system 810 is not physically bound to any of the clients 801, but instead communicates over a network, it is difficult for the system 810 to determine whether any of the respective clients 801 have experienced a power cycle. Nevertheless, if the client does have a TPM, that TPM might track just enough information to be able to infer that a power cycle has occurred. This is possible even if the local client TPM is not fully functioning given that the trusted execution environment commands may not be given to the local TPM, but rather are intercepted and dispatched to the system 810. For instance, in FIG. 8, client 801A is illustrated as including TPM 802A, client 801B is illustrated as including TPM 802B, and client 801E is illustrated as including TPM 802E.

In this case, the account management module 812 and/or the system 810 as a whole may detect that a given client has been rebooted by communicating with the local client TPM installed in that client (e.g., communicating with TPM 802A in the case of client 801A). For instance, the system 810 may receive a cryptographic statement from the client 801A indicating that a power cycle has occurred. There are a number of ways that this might happen.

In a first example, the system 810 and local client TPM may communicate so that the system 810 receives PCR values associated with registers that would be reset upon a power cycle. The system 810 then compares the current value of the PCR in the protected data at the system with the value of the PCR in the local client TPM, and can infer whether a power cycle has occurred.

In a second example, local client TPM may establish an ephemeral key upon every power up of the client, and then negotiate with the client processor the use of this ephemeral key in order to communicate. The system 810 has awareness of this ephemeral key since it is tracking communications. If the system 810 detects that it is no longer able to understand the communications, then the ephemeral key must have changed, implying that the client has experienced a power cycle.

In an alternative embodiment, a power cycle of the system 810 may be detected even without a TPM on the system 810. For instance, this could be accomplished by having a system monitor which is capable of monitoring power cycling of client systems. A non-limiting example of such a system monitor is the MICROSOFT® System Center Virtual Machine Monitor (or SCVMM).

The system 810 may add protected data sets to a given account whenever a new client is added to the account. For instance, when a communication is detected associated with a particular account, and that communication somehow indicates that this is from an unrecognized client, then a new data set may be added to that account. Thus, for instance, assuming the client uses an encryption key to communicate with the system, if a communication arrives that uses an unrecognized encryption key, then perhaps a new client has been added. Likewise, a protected data set for an account may be deleted after a corresponding client is no longer operating on the account. For instance, there may be a garbage collection action in which protected data sets that have not been used for some period of time (perhaps years) are deleted from the account.

A policy module 814 may serve to allow actions by a client depending on whether criteria have been satisfied with respect to one or more data fields of the protected data set corresponding to the client. Alternatively or in addition, the policy module 814 may serve to allow actions by any client associated with an account depending on whether criteria have been satisfied with respect to one or more data fields of the account-level data sets. Combined with the fact that the memory associated with a protected data set could be significantly augmented as compared to a local TPM, this enables significant possibilities.

For instance, suppose that the protected data set for a given client includes an entire image of a restore state of the client (e.g., the operating system, any standard applications, standard configuration settings, and so forth). If that client has been lost or damaged, another client on the account may access the image and install the image on the new client provided that certain policy is met, such policy intended to be protected against improperly obtaining the restore state of the client. Alternatively, the key could be held in the protected data set, and the key protects the restore state somewhere else. In that case, the key would be made accessible only if policies are met.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for cloning source virtual machine state having an associated trusted execution environment to formulate a target virtual machine state, the method comprising:
    an act of accessing a source virtual machine state of a source virtual machine having an identity, the source virtual machine state including a trusted execution environment that has at least an endorsement hierarchy, the endorsement hierarchy including a signing portion, the endorsement hierarchy being based on the identity of the source virtual machine;
    an act of copying the source virtual machine state to formulate a target virtual machine state that is to be associated with a target virtual machine having an identity that is different than that of the source virtual machine, the target virtual machine state having a signing portion and endorsement hierarchy that is based on the identity of the source virtual machine, wherein the signing portion of the copied endorsement hierarchy is at least temporarily disabled at the target virtual machine while the signing portion of the endorsement hierarchy at the source virtual machine state remains enabled; and
    an act of modifying the target virtual machine state such that the endorsement hierarchy of the target virtual machine state is based on the identity of the target virtual machine, thereby enabling the signing portion of the target virtual machine, and such that the signing portions of both the source and target virtual machine states are operable.

2. The method in accordance with claim 1, wherein the source virtual machine state represents a state of the source virtual machine at a prior state of time, wherein the cloning is performed in order to perform a rollback of the source virtual machine so that the target virtual machine may continue as the rolled back version of the source virtual machine, and such that the source virtual machine itself no longer operates.

3. The method in accordance with claim 1, wherein the source virtual machine state represents a paused state of the source virtual machine such that after the cloning, the source virtual machine continues to operate beginning with the source virtual machine state, and such that the target virtual machine begins operation using the target virtual machine state.

4. The method in accordance with claim 1, wherein enablement of the signing portion of the endorsement hierarchy of the source virtual machine is conditioned on the identity of the source virtual machine not having been changed from the identity.

5. The method in accordance with claim 4, wherein a value in a persistent portion of the trusted execution environment changes as a result of the act of copying such that a value of the persistent portion of the trusted execution environment is different in the source virtual machine state as compared to the target virtual machine state, and wherein the value in the persistent portion is used to at least partially prove whether or not the identity of the associated virtual machine has changed from the identity that forms the basis of the endorsement hierarchy in the associated virtual machine.

6. The method in accordance with claim 5, wherein the changed value of the persistent portion identifies that cloning event.

7. The method in accordance with claim 4, wherein a value of a persistent monotonic counter of the trusted execution is incremented in the target virtual machine state as compared to the source virtual machine state, and wherein the value of the monotonic counter is used to at least partially prove whether or not the identity of the associated virtual machine has changed from the identity that forms the basis of the endorsement hierarchy in the associated virtual machine.

8. The method in accordance with claim 1, wherein the source virtual machine state is first source virtual machine state, the target virtual machine is a first target virtual machine, and the target virtual machine state is a first target virtual machine state, the method further comprising:
   an act of accessing second source virtual machine state of the source virtual machine after the source virtual machine continued operating from the first source virtual machine state, the second source virtual machine state also including the endorsement hierarchy based on the identity of the source virtual machine;
   an act of copying the second source virtual machine state to formulate a second target virtual machine state that is to be associated with a second target virtual machine having an identity that is different than that of the source virtual machine, wherein a signing portion of the endorsement hierarchy that is copied to the second target virtual machine state is disabled; and
   an act of modifying the second target virtual machine state such that the endorsement hierarchy of the second target virtual machine state is based on the identity of the second target virtual machine.

9. The method in accordance with claim 1, wherein the source virtual machine is a first source virtual machine, the target virtual machine is a second source virtual machine, the method further comprising:
   an act of accessing a second source virtual machine state of the second source virtual machine after the second source virtual machine continues operating from the first target virtual machine state, the second source virtual machine state also including the endorsement hierarchy based on the identity of the second source virtual machine;
   an act of copying the second source virtual machine state to formulate a second target virtual machine state that is to be associated with a second target virtual machine having an identity that is different than that of the second source virtual machine, wherein a signing portion of the endorsement hierarchy that is copied to the second target virtual machine state is disabled; and
   an act of modifying the second target virtual machine state such that the endorsement hierarchy of the second target virtual machine state is based on the identity of the second target virtual machine.

10. The method in accordance with claim 1, wherein the trusted execution environment is a software-based trusted execution environment.

11. The method in accordance with claim 10, wherein the software-based trusted execution environment is present on a host computing system that hosts the source virtual machine.

12. The method in accordance with claim 1, wherein the trusted execution environment is at least partially present in a cloud computing environment.

13. The method in accordance with claim 1, wherein a new endorsement key is created for the trusted execution environment present within the target virtual machine state.

14. The method in accordance with claim 13, wherein enablement of a signing portion of the new endorsement key is conditioned upon the identity of the target virtual machine.

15. A computer program product comprising one or more computer memory devices having thereon computer-executable instructions that, when executed by one or more processors of the computing system, cause the computing system to implement a method for cloning a virtual machine state having an associated trusted execution environment to form a target virtual machine state, the method comprising the following:
   an act of detecting that cloning of a source virtual machine is to occur;
   in response to detecting, an act of accessing a source virtual machine state of the source virtual machine, the source virtual machine having an identity, the source virtual machine state including a trusted execution environment that has an endorsement hierarchy, the endorsement hierarchy based on the identity of the source virtual machine;
   an act of copying the accessed source virtual machine state to formulate a target virtual machine state that is to be associated with a target virtual machine having an identity that is different than that of the source virtual machine;
   an act of ensuring that at least a signing portion of the endorsement hierarchy of the source virtual machine is enabled at the source virtual machine and a corresponding endorsement hierarchy of the target virtual machine state is at least temporarily disabled at the target virtual machine after copying the accessed source virtual machine state to the target virtual machine state;
   an act of creating a new endorsement key that is bound to the endorsement hierarchy of the target virtual machine state; and
   an act of modifying the target virtual machine state with the new endorsement key such that the endorsement hierarchy of the target virtual machine state is based on the identity of the target virtual machine rather than the source virtual machine, and in such a manner that the signing portion of the endorsement hierarchy becomes enabled on the target virtual machine, and such that the signing portions of both the source and target virtual machine states are operable.

16. The computer program product in accordance with claim 15, wherein the source virtual machine state represents a state of the source machine at a prior state of time, wherein the cloning is performed in order to perform a rollback of the source virtual machine so that the target virtual machine may continue as the rolled back version of the source virtual machine, and such that the source virtual machine itself no longer operates.

17. The computer program product in accordance with claim 15, wherein the source virtual machine state represents a paused state of the source virtual machine such that after the cloning, the source virtual machine continues to operate beginning with the source virtual machine state, and such that the target virtual machine begins operation using the target virtual machine state.

18. The computer program product in accordance with claim 15, wherein the trusted execution environment is a software-based trusted execution environment that is present on a host computing system that hosts the source virtual machine.

19. The computer program product in accordance with claim 15, wherein the trusted execution environment is at least partially present in a cloud computing environment.

20. A host computing system having running thereon at least the following:
   physical resources including at least one or more physical processors and physical memory;
   a plurality of virtual machines that includes at least a first virtual machine associated with a first software-based trusted execution environment, and a second virtual machine associated with a second software-based trusted execution environment, the second virtual machine being a clone of the first virtual machine with the second software-based trusted execution environment being copied from the first software-based trusted execution environment, but wherein a signing portion of the second software-based trusted execution environment has been changed to be different from a corresponding signing portion of the first software-based trusted execution environment and such that the signing portion of both the first and second software-based trusted execution environments remain operable; and a hypervisor that intermediates between the plurality of virtual machines and the physical resources, the hypervisor configured to clone the first virtual machine to create the second virtual machine by performing the following:

an act of accessing a source virtual machine state of the first virtual machine, the first virtual machine state including a trusted execution environment that has at least an endorsement hierarchy, the endorsement hierarchy including a signing portion, the endorsement hierarchy being based on an identity of the first virtual machine;

an act of copying the source virtual machine state to formulate a target virtual machine state that is associated with the second virtual machine having an identity that is different than that of the first virtual machine, the target virtual machine state having a signing portion and endorsement hierarchy that is based on the identity of the first virtual machine, wherein the signing portion of the copied endorsement hierarchy is at least temporarily disabled at the second virtual machine while the signing portion of the endorsement hierarchy at the source virtual machine state remains enabled; and an act of modifying the target virtual machine state such that the endorsement hierarchy of the target virtual machine state is based on the identity of the second virtual machine, thereby enabling the signing portion of the second virtual machine, and such that the signing portions of both the source and target virtual machine states are operable.

* * * * *